United States Patent
Ballard

(10) Patent No.: US 8,544,585 B2
(45) Date of Patent: Oct. 1, 2013

(54) REINFORCED FOAM VEHICLE CHASSIS

(76) Inventor: Lon R. Ballard, Carrollton, IL (US)

( * ) Notice: Subject to any disclaimer, the term of this patent is extended or adjusted under 35 U.S.C. 154(b) by 0 days.

(21) Appl. No.: 13/256,762

(22) PCT Filed: Mar. 16, 2010

(86) PCT No.: PCT/US2010/027444
§ 371 (c)(1),
(2), (4) Date: Sep. 15, 2011

(87) PCT Pub. No.: WO2010/107766
PCT Pub. Date: Sep. 23, 2010

(65) Prior Publication Data
US 2012/0024612 A1 Feb. 2, 2012

Related U.S. Application Data

(60) Provisional application No. 61/161,468, filed on Mar. 19, 2009.

(51) Int. Cl.
B62D 29/04 (2006.01)
B62D 23/00 (2006.01)
B62D 21/15 (2006.01)

(52) U.S. Cl.
USPC ..... 180/89.1; 180/312; 296/900; 296/187.04; 296/187.05

(58) Field of Classification Search
USPC ........... 180/311, 312, 89.1; 296/900, 901.01, 296/181.1, 181.2, 187.01, 187.03, 187.04, 296/187.05, 203.01
See application file for complete search history.

(56) References Cited

U.S. PATENT DOCUMENTS

| | | | |
|---|---|---|---|
| 3,559,920 A | 2/1971 | Moore | |
| 3,619,344 A | 11/1971 | Wolinski | |
| 3,853,349 A | 12/1974 | Moore | |
| 3,931,098 A | 1/1976 | Herweg et al. | |
| 4,099,280 A | 7/1978 | Hoppe et al. | |
| 4,455,338 A | 6/1984 | Henne | |
| 4,574,902 A * | 3/1986 | Irimajiri | 180/350 |
| 4,705,716 A * | 11/1987 | Tang | 442/224 |
| 4,710,415 A | 12/1987 | Slosberg et al. | |
| 5,000,515 A | 3/1991 | Deview | |
| 5,312,145 A | 5/1994 | McNeil | |
| 5,343,973 A | 9/1994 | Lanker | |
| 5,393,603 A * | 2/1995 | Toyoda et al. | 428/316.6 |
| 5,690,046 A | 11/1997 | Grzech, Jr. | |
| 5,707,571 A | 1/1998 | Reedy | |
| 5,806,622 A * | 9/1998 | Murphy | 180/210 |
| 5,952,089 A | 9/1999 | Namura et al. | |
| 6,863,339 B2 | 3/2005 | Bohm et al. | |
| 7,000,978 B1 * | 2/2006 | Messano | 296/181.6 |
| 7,157,034 B2 * | 1/2007 | Bristow et al. | 264/250 |
| 7,189,040 B2 * | 3/2007 | Sharp et al. | 410/42 |
| 7,220,374 B2 | 5/2007 | Zander et al. | |
| 7,399,028 B1 | 7/2008 | Castillo et al. | |
| 7,762,375 B2 * | 7/2010 | Matsuyama et al. | 181/290 |
| 8,007,706 B2 * | 8/2011 | Wacker et al. | 264/322 |
| 2008/0119978 A1 | 5/2008 | Stieff et al. | |
| 2011/0189465 A1 | 8/2011 | Maurer et al. | |

OTHER PUBLICATIONS

International Preliminary Report on Patentability from corresponding International Application No. PCT/US2010/027444, mailed May 17, 2010.

* cited by examiner

*Primary Examiner* — Drew Brown
(74) *Attorney, Agent, or Firm* — Senniger Powers LLP

(57) ABSTRACT

A light-weight vehicle component such as a vehicle chassis (100) formed from an internally reinforced rigid closed-cell foam (12). The reinforced closed-cell foam vehicle chassis (100) includes an outer layer of rigid closed-cell foam (108a), an inner layer of rigid closed-cell foam (108c), and one or more layers of reinforcing structural material (114) disposed between the inner and outer layers of foam. The reinforced closed-cell foam vehicle chassis incorporates reinforced attachment points (114a) for receiving and supporting vehicle components, such as suspension elements, steering components, a drive motor, and passenger accommodations.

20 Claims, 6 Drawing Sheets

REINFORCED FOAM VEHICLE CHASSIS

CROSS-REFERENCE TO RELATED APPLICATIONS

The present disclosure is the United States National Stage under 35 U.S.C. §371 of International Application Serial No. PCT/US2010/027444, having an International Filing Date of Mar. 16, 2010 and is related to, and claims priority from, U.S. Provisional Patent Application Ser. No. 61/161,468 filed on Mar. 19, 2009, and which is herein incorporated by reference.

STATEMENT REGARDING FEDERALLY SPONSORED RESEARCH

Not Applicable.

BACKGROUND OF THE INVENTION

The present invention is related generally to light-weight vehicles and methods for manufacture thereof, and in particular, to light-weight reinforced closed-cell foam parts or chassis for a vehicle and a method for providing impact protection to pedestrians, passengers, and objects using a layered and reinforced closed-cell foam chassis vehicle construction.

Conventional light-weight motor vehicles, such as motorcycles, mopeds, and three-wheel "trike" vehicles having a front steering wheel and a pair of laterally displaced rear wheels, often disposed on a transverse axle, traditionally lack a protective body structure or chassis which encloses an occupant or driver. Accidents involving these types of vehicles, either with other vehicles, pedestrians, or stationary objects, often result in severe injuries and fatalities due to the lack of protective enclosure and impact-absorbing materials. However, these types of vehicles remain popular despite the associated risks is due to the lower costs associated with manufacturing, purchasing, and maintaining such vehicles. Typically, these types of light-weight vehicle can be acquired for a relatively low cost as compared to enclosed four-wheel vehicles, can operate in smaller spaces and crowded urban environments, and are fuel efficient.

Accordingly, it would be advantageous to provide an enclosure or chassis for light-weight vehicles which provides structural support for the vehicle, which provides occupant protection in the event of an impact, and which does not significantly increase the cost of manufacture of the vehicle or decrease the fuel efficiency. Cars, trucks, and other vehicles can increase safety and fuel efficiency while significantly decreasing weight with this technology.

BRIEF SUMMARY OF THE INVENTION

Briefly stated, the present disclosure provides components for a light-weight vehicle, such as a chassis, formed from an internally reinforced rigid foam. The reinforced closed-cell foam vehicle chassis includes an outer layer of rigid foam, an inner layer of rigid foam, and one or more reinforcing structural members or layers disposed between the inner and outer layers of foam. The reinforced closed-cell foam vehicle chassis incorporates reinforced structural attachment points for receiving and supporting vehicle drive components, such as suspension elements, steering components, a drive motor, and passenger accommodations. The exposed surfaces of the inner and outer layers of rigid foam may be treated to receive paint or have a soft flexible outer skin.

In one embodiment of the present disclosure, the light-weight reinforced closed-cell foam vehicle chassis is formed from inner and outer layers of closed-cell rigid foam, enabling the vehicle chassis to function as a flotation device in the event of immersion in water.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
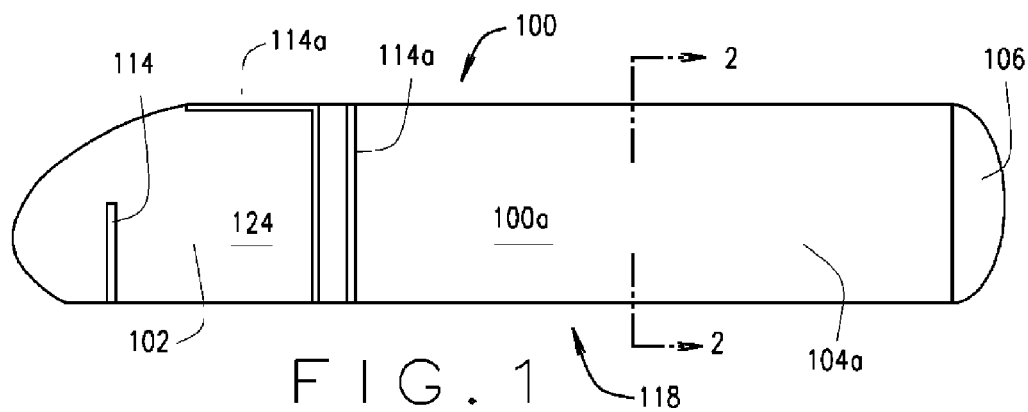
FIG. 1 is a side plan view of a reinforced closed-cell foam vehicle chassis of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the figures in general, the present disclosure sets forth a reinforced closed-cell foam vehicle component, such as a vehicle body or chassis, adapted to provide impact protection to pedestrians, passengers, and objects when employed in the assembly of a light-weight motor vehicle. Placement of one or more layers or panels of a strong fiber or structural reinforcement within the foam of the component, vehicle body, or chassis strengthens the vehicle chassis or component in compression by resisting buckling in the event of an impact. By providing the vehicle chassis as a foam laminate with internal reinforcement by rigid materials, fibers, and/or glue and resins, the vehicle chassis functions to protect occupants by stopping or slowing penetrating objects during a collision or impact. The internal reinforcement functions to hold the foam together to protect and strengthen it from breakage, providing increased crush strength. In addition, the internal reinforcement layers further serve to strength the low density foam sufficiently to permit the construction of large light weight objects without requiring exterior strengthening and with a minimum amount of interior strengthening materials or metal.

In contrast, composite foam panels presently used in vehicles and aircraft consist of two layers, generally having a soft foam on an inside layer, and a hard, stiff load carrying material on an outside layer. When a structural reinforcement such as fiberglass, carbon fiber, or other composite material is disposed on an external surface of a foam structure, the structural reinforcement may delaminate from the foam over time, or must be made thicker and heavier to achieve a desired appearance and strength. In contrast, by disposing the fiber or structural reinforcement layers between an inner and outer layer of a rigid foam, the bond between the foam and strong reinforcing material layers within the foam is improved because the foam bonds to double the surface area (two sides) in comparison to bonding to only one side of a material disposed on an external surface.

Figure 2:
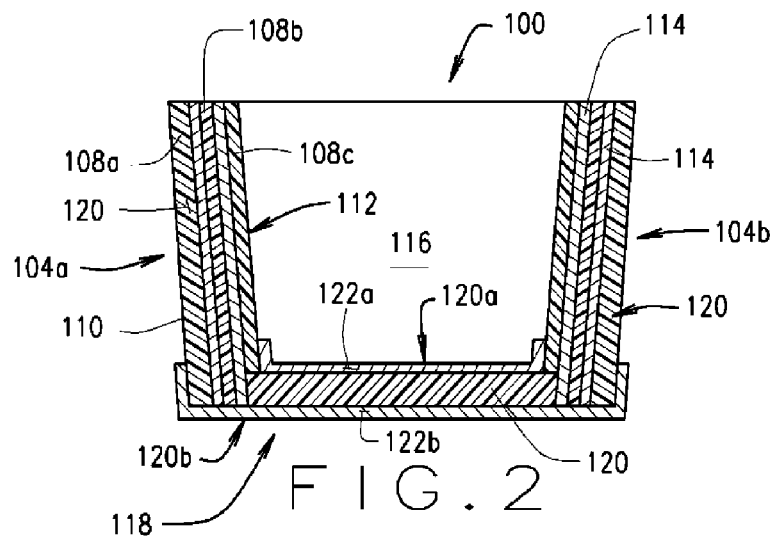
FIG. 2 is a sectional view of the reinforced closed-cell foam vehicle chassis of FIG. 1, taken at line A-A, illustrating fiber reinforcement of the foam vehicle chassis.
Figure 3:
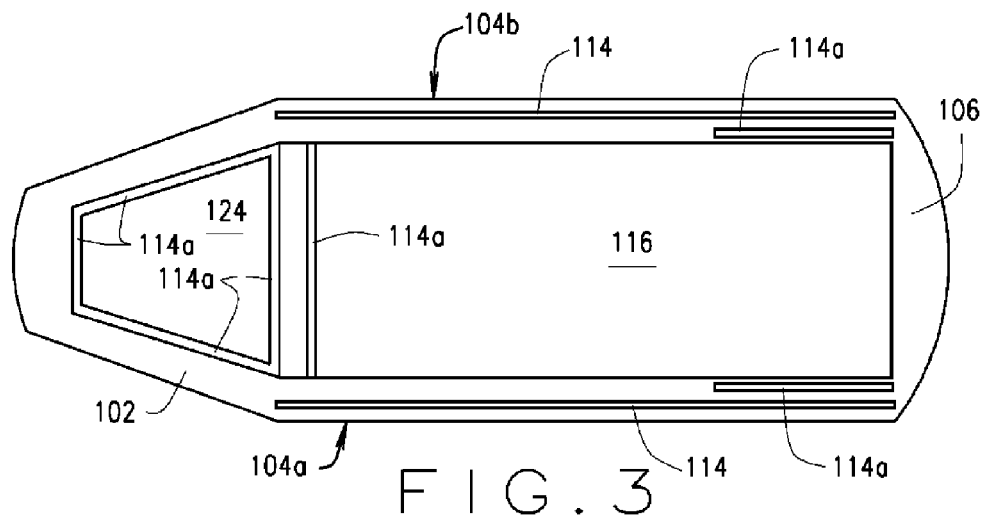
FIG. 3 is a top plan view of the reinforced closed-cell foam vehicle chassis of FIG. 1.
Figure 4:
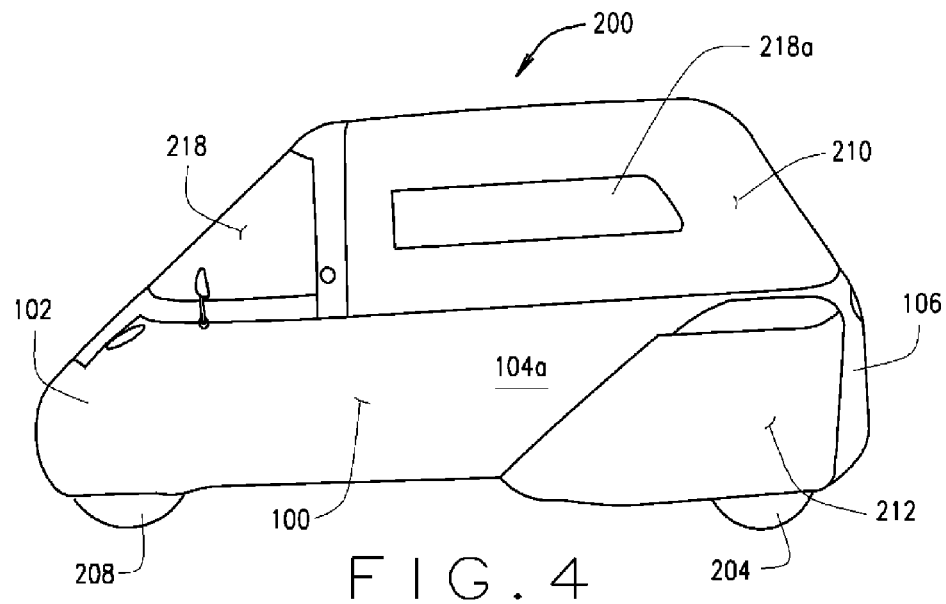
FIG. 4 is a side view of a vehicle constructed with the reinforced closed-cell foam vehicle chassis of FIG. 1.
Figure 5:
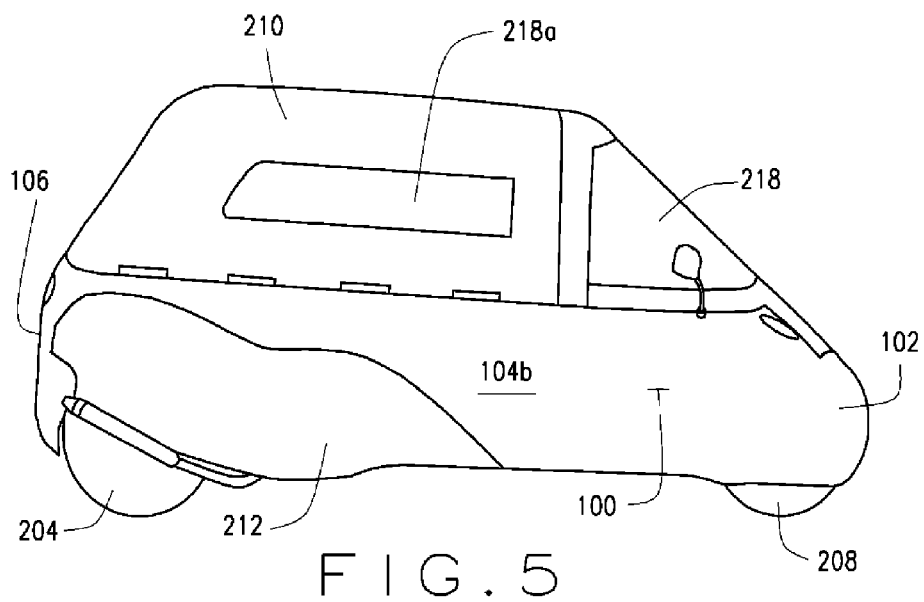
FIG. 5 is an opposite side view of the vehicle in FIG. 4.
Figure 6:
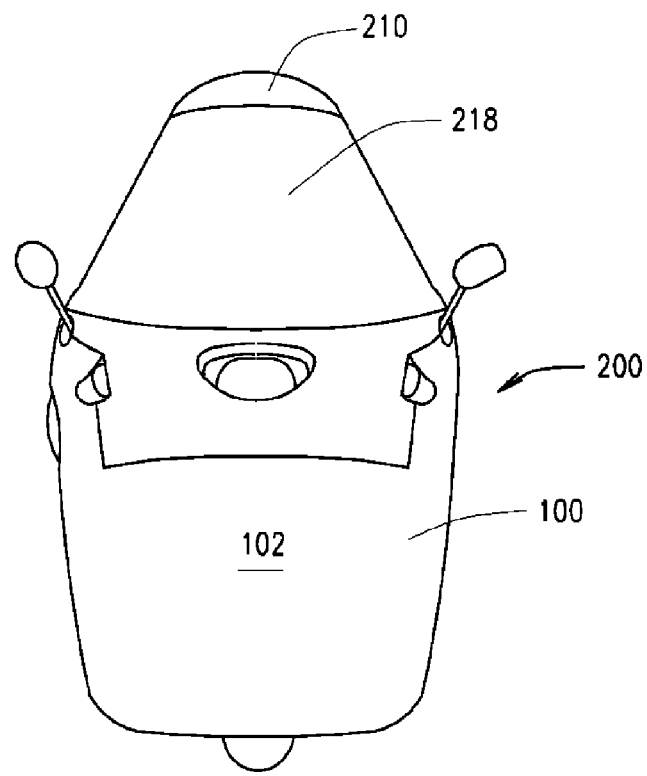
FIG. 6 is a front view of the vehicle in FIG. 4.
Figure 7:
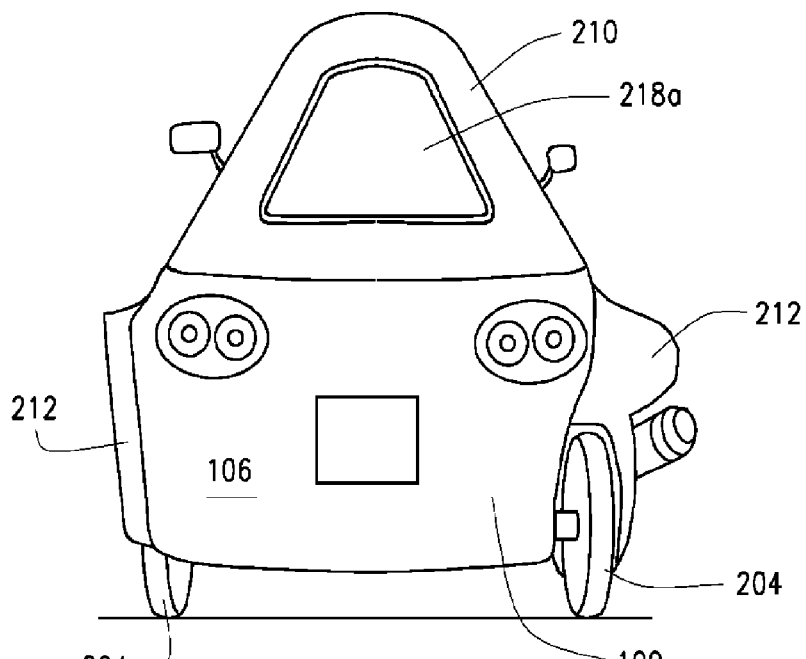
FIG. 7 is a back view of the vehicle in FIG. 4.
Figure 8:
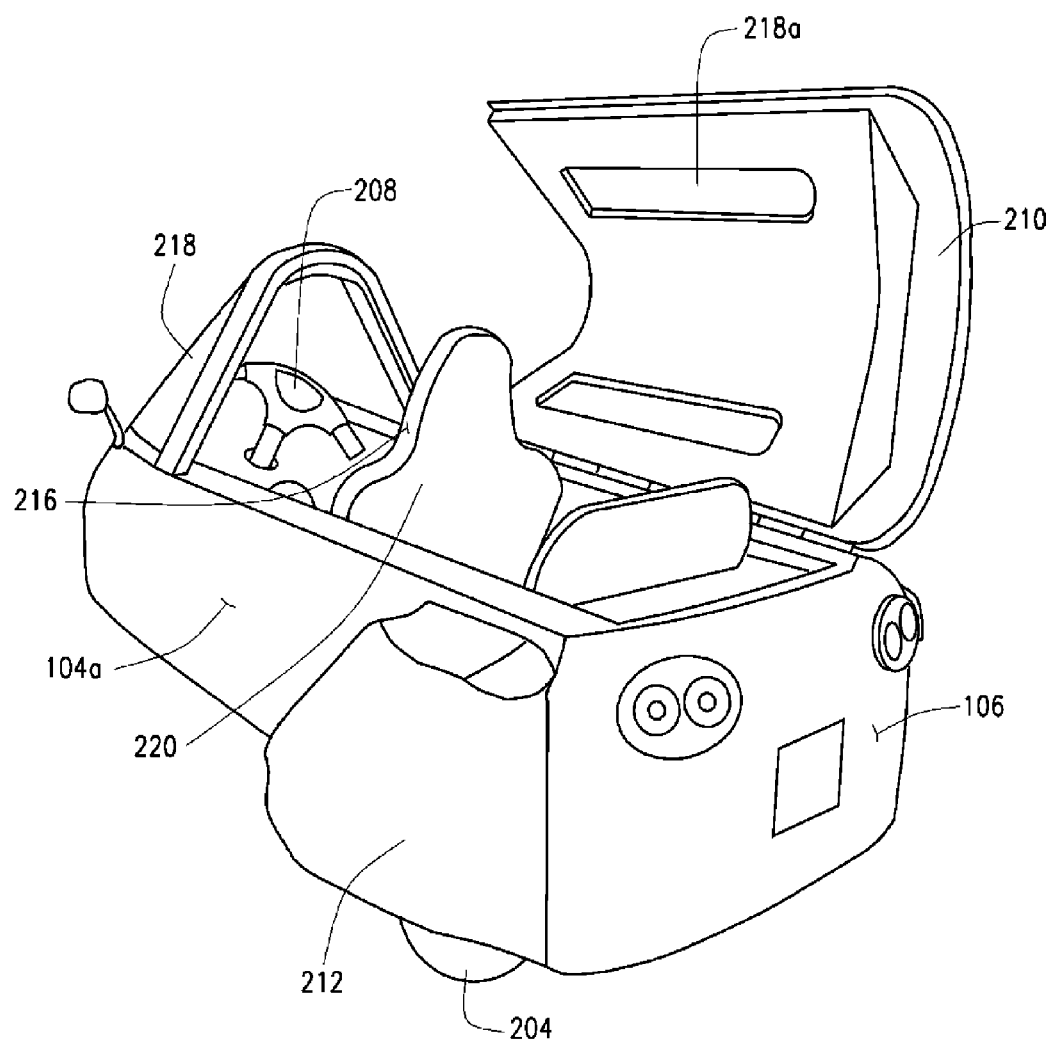
FIG. 8 is a perspective view of the vehicle in FIG. 4, with the integrated door and canopy in an open position.

As shown in FIGS. 1-3, a reinforced closed-cell foam vehicle component in the form of a vehicle chassis 100, of the present disclosure consists generally of a closed-cell foam laminate body 100a having a front segment 102, side panels 104a, 104b, and a rear segment 106 which are each constructed with layers 108a-c of a rigid closed-cell foam to be soft or compliant on the outside surface 110 and an inside surface 112. Those of ordinary skill in the art will recognize that the particular shape and configuration of the vehicle chassis 100 may be varied to accommodate a variety of shapes, sizes, passengers, and purposes without departing from the scope of the present disclosure. For example, FIGS. 9-14 illustrate an alternate configuration of the vehicle chassis 100 from that which is shown in FIGS. 1-3, but incorporating the same construction of rigid closed-cell foam layers with internal reinforcing layers.

An exemplary closed-cell foam is a polyurethane foam having a density of 40 kg/m$^3$, a closed cell content of 95%, a compressive strength about 32.9 psi, a tensile strength of about 50 psi, a shear strength of 40 psi, and a flexural strength of 60 psi. Additional strength and reinforcement of the vehicle chassis 100 is achieved by sandwiching or laminating one or more layers of a stiff reinforcing materials 114 such as epoxy fiberglass, plastics, honeycomb coreboard, or metal components between the inner and outer layers 108a, 108c of rigid closed-cell foam. The honeycomb coreboard or other reinforcing material layers 114 embedded inside the layers 108a-c of foam function to strengthen and stiffen the structure of the vehicle chassis 100 while providing protection to stop objects from intruding into an internal passenger compartment 116 in the event of an impact or collision. Additional segments of reinforcing material layers 114 secured to, or embedded within the layers 108a-c of closed-cell foam service as rigid structural attachment mountings 114a onto which components of the vehicle 200 may be secured. An exemplary honeycomb coreboard material may have an inner cell-core diameter of 8.0 mm, a capacity of 80-90 Kg/m$^3$, a compressive strength of 2.3 MPa, and a shear strength of 0.5 MPa.

As seen in FIG. 2, the bottom segment or portion 118 of the vehicle chassis 100 is preferably enclosed by a layer of rigid closed-cell foam 120, reinforced on both an internal surface 120a and an external surface 120b with layers 122a and 122b of rigid reinforcing material, such as a fiberglass epoxy to provide wear resistance against road debris impacts, and to provide suitable support for passenger accommodations disposed within the passenger compartment 116 of the vehicle chassis 100. Similar reinforcing external layers 122a, 122b of rigid reinforcing material may be used on other interior and exterior surface of the vehicle chassis 100 where required for safety, such as on the external surfaces of the vehicle chassis firewall, or where required as attachment mountings 114a for attachment of accessory components such as a drive-train or engine, steering components, or suspension components.

With the vehicle chassis 100 shown in FIGS. 1-3, the reinforced closed-cell foam construction is sufficiently rigid and durable to function as a replacement for hard, heavy, metal and plastic chassis structure and external body panels on a conventional enclosed passenger vehicle. Those of ordinary skill in the art will recognize that a supplemental layer of a suitable flexible covering (not shown) may be applied to the exterior surfaces 110 of the reinforced closed-cell foam vehicle chassis 100 in the form of a flexible paint or thin UV protective layer for appearance as shown in FIGS. 4-7 and to protect the reinforced closed-cell foam vehicle chassis 100 from degradation due to sunlight (ultraviolet (UV) light). Alternatively, the closed-cell foam layers 108a-c may be covered with a UV-resistant soft flexible colored foam for both aesthetics and sun protection, or may be molded with an integrated protective skin outer layer (not shown). An outer skin layer can also be made from any durable flexible or energy absorbing or soft material such as 3-6 mm of a vinyl, rubber, ethylene vinyl acetate, neoprene, soft plastic, etc, and bonded to the reinforced closed-cell foam by any suitable means, such as a rubber adhesive.

Vehicle occupant and pedestrian safety is improved with use of energy absorbing rigid closed-cell foam layers 108a-108c in the vehicle chassis 100, and the light weight of the reinforced closed-cell foam vehicle chassis 100 decreases fuel consumption when used to construct a motor vehicle.

By reinforcing the rigid closed-cell foam layers 108a-c with layers rigid structural materials 114, the vehicle chassis 100, structural support elements 114a, and interior components of the vehicle 200 can be made integral with the rigid closed-cell foam layers 108a-c forming the vehicle body 100a. Preferably, segments and layers 114 of fiberglass, resins, plastic, honeycomb coreboard, and metal (such as aluminum) may be imbedded between the inner foam layer 108c and outer foam layers 108a to transfer and distribute loads and stresses throughout the reinforced closed-cell foam chassis 100 from various structural supporting mounts for an engine 202 and drive train components (including wheels) 204, suspension components 206, steering components 208 including one or more steered wheels, doors or removable/hardtops and canopies 210, such as shown in FIGS. 4-8.

Cosmetic components, such as light-weight wheel covers 212 or splash guards 214 may be secured to rigid mounting points 114a disposed in the reinforced closed-cell foam chassis 100, or secured directly to the chassis 100 by coupling to the reinforcing material layers 114 within the chassis structure. Aluminum extrusions and formed sheet metal integrated into the reinforced closed-cell foam vehicle chassis 100 may be utilized to provide structural stability and provide the steering components 208, engine 202, wheels and drive train 204, interior seats 216, windshield 218 and windows 218*a*, and suspension structural mounting points. Similarly, structural stability and mounting points for the window casings, lights, rear view mirrors and other cosmetic components of the vehicle 200 may be formed from rigid plastic components integrated into the reinforced closed-cell foam vehicle chassis. Ideally, the windshield 218 and other window panels 218*a* are formed from a clear polycarbonate material, selected to promote safety and reduce or minimize the likelihood of personal injury to a passenger in the event of breakage.

The use of a light-weight reinforced closed-cell foam chassis 100 of the present disclosure greatly reduces vehicle weight while increasing light-weight vehicle safety to both occupants and pedestrians in the event of a collision or impact. Pedestrian safety is enhanced by the reduced kinetic energy of a light-weight foam vehicle when it collides. Other advantages of employing a reinforced closed-cell foam chassis 100 for a vehicle 200 include a reduced cost of repair in the event of damage to the foam chassis 100 structure, and a reduction in overall damage to the vehicle 200 and others in the event of an impact or collision. Vehicles 200 and objects constructed with a reinforced closed-cell foam chassis 100 may have a reduced environmental impact and footprint when compared with similar vehicles or objects constructed of traditional plastics or metals. For example, the reinforced closed-cell foam layers 108*a-c* employed in the construction of the vehicle chassis 100 of the present invention may be may from a renewable resource such as soybeans, and incorporate fewer high-cost materials such as metals or plastics.

Constructing a motorized vehicle with a reinforced closed-cell foam chassis 100 of the present disclosure offers several benefits and advantages. The use of light-weight structurally reinforced closed-cell foam chassis 100 reduced the overall weight of the vehicle as compared to a similar vehicle constructed using conventional metal and plastic components. The resulting vehicles will have better fuel economy and reduced emissions. The lighter weight of the vehicle enables the use of electric motors or electric hybrid motors, requiring less power to propel the vehicle, and correspondingly, reducing the size of the required energy storage cells (batteries) and the size of the driving motor, thereby reducing vehicle emissions and environmental impact.

In the event of an impact or collision, a vehicle 200 constructed with a reinforced closed-cell foam chassis 100 will provide improved protection to the occupants and to people or objects outside the vehicle 200. The external layer 108*a* of closed-cell foam 120 on the vehicle chassis 100 functions to absorb impact energy, reducing damage to pedestrians and objects impacted by the vehicle 200. Outside and structural foam layers 108*a-c* absorb energy upon impact to lessen the g-force to the driver and passengers. When a foam layer 108 rips upon impact, the soft exposed edges do not present a cut or laceration hazard. Correspondingly, the interior foam layer 108*c* functions to soften impacts the driver and/or passenger may experience inside the vehicle passenger compartment 116 during a collision or roll-over event by absorbing some of the impact energy.

The exemplary vehicle 200 shown in FIGS. 4-9 is constructed using the reinforced closed-cell foam chassis 100 of the present disclosure for majority of the body, chassis, interior, and exterior components to save weight and to decrease fuel consumption. The vehicle 200 provides protection to the passengers, pedestrians, and any impacting object both inside and outside of the vehicle. With the majority of a vehicle 200 constructed from the structural reinforce foam chassis 100, the vehicle 200 incorporates several inches of protective layers 108, instead of a fraction of an inch as may be found in conventional fiberglass or plastic body vehicles. In contrast, light-weight vehicles constructed with metal bodies or no external body panels at all offer only limited amounts of passive impact protection between the rigid interior surfaces and the passenger, and require additional safety devices such as active air bags to protect the passengers. The vehicle 200 constructed with the reinforced closed-cell foam chassis 100 of the present disclosure provides passive protection to passengers inside the passenger compartment 116, other vehicles, other objects, and pedestrians by keeping the structurally rigid components to a minimum and encasing them in an energy absorbing layer of foam 108*a-c*.

Those of ordinary skill in the art will recognize that the reinforced closed-cell foam vehicle chassis 100 shown and described herein is not limited to the specific configuration as described herein or as shown in the FIG. 1-3 or 4-8. It will be further recognized that alternative vehicle designs may vary in how much reinforced closed-cell foam 120 is used and in the placement of the reinforcement structural material 114 between the layers of foam. The size and design of the vehicle 200, including the number of wheels, and amount of foam protection desired, will determine the type, amount, and density of the foam 120, as well as the amount and placement of the incorporated reinforcement material 114 within the chassis 100. For example, as shown in FIGS. 9-14 an alternate configuration of a vehicle 200 may incorporate a unitary reinforced closed-cell foam chassis with the reinforcing structural material segments 114, 118, and 220 composed of a honey-comb coreboard strengthened with a layer of epoxy-coated fiberglass. Preferably, the reinforcing structural material segments 114, 118, and 220 are positioned in a mold prior to the injection of the closed-cell foam, thereby allowing the unitary chassis to be formed about the segments.

It will further be recognized that the specific material incorporated into the reinforced closed-cell foam vehicle chassis 100 as reinforcement 114 may be varied as is required by the specific application or intended use of the resulting reinforced closed-cell foam structure. For example, material quality, thickness, and weight, may be varied, as may the specific material utilized, such as fiberglass, carbon fibers, and Kevlar, etc.). The shape and configuration of the reinforcement material 114 disposed within the foam layers 108*a-c* may similarly be selected from solid sheets, woven materials, mats, chopped fibers, etc., as may the applied resin mixes of epoxy, polyester resin, glues, etc. employed for bonding the reinforcing materials 114 together.

In the exemplary vehicle 200 manufactured using the reinforced closed-cell foam vehicle chassis of the present disclosure as shown in FIGS. 4-8, the front segment 102 and side panels 104*a*, 104*b* of the vehicle 200, that may injure a person or damage an object in the event of a collision are soft, and are about six inches thick. The bottom floor pan 118 of the vehicle 200 consists of approximately one to two inches of rigid closed-cell foam or honeycomb 120, with an external fiberglass layers bonded to surfaces 120*a* and 120*b* for strength and rigidity.

An exemplary process for manufacturing of a chassis 100 of the present disclosure for a vehicle 200 involves a multi-step process. Initially, a combination of hand layering or foam molding may be used to form the composite foam into the general shape of the vehicle chassis 100. The reinforced closed-cell foam is made up of several basic parts, including foam 120 from a ready made slab, or molded foam formed by mixing chemicals within a suitable mold, reinforcing fibers and/or material layers 114 that give additional strength and other properties such as energy absorption, material binding, etc., and binding agents such as epoxy, fiberglass resins, glues, etc. that bind and strengthen the reinforcing materials and the closed cell foam. Those of ordinary skill in the art will recognize that the foam chemicals may also act as the binding agent when the foam is formed by mixing in a mold. In an exemplary vehicle 200, epoxy and fiberglass were applied to the exterior and interior surfaces 110, 112 of the closed-cell foam 120. The epoxy glued the fiberglass and the foam together to make a strong rigid assembly which defined the vehicle chassis 100. On the vehicle's sides 104a and 104b, a reinforcing layer 114 of epoxy impregnated fiberglass was glued between an outer four inch thick foam layer 108a and to a two inch thick foam layer 102c. The resulting vehicle's sides were soft on the outside and inside for both passenger and pedestrian protection, due to the stiff and strong materials (epoxy fiberglass, aluminum, and plastics) being embedded within the foam layers. Support panels 220 formed from the reinforcing material 114 for seats 216 may be disposed within the passenger compartment 116

On the vehicle's horizontal bottom surface or pan, the foam layers 120 were covered with outer layers 120a and 120b of epoxy and fiberglass in normal composite design configuration in order to have a strong surface inside the passenger compartment 116 to support passenger weight, and to make the bottom of the vehicle 200 resistant to rocks and abrasion.

Figure 9:
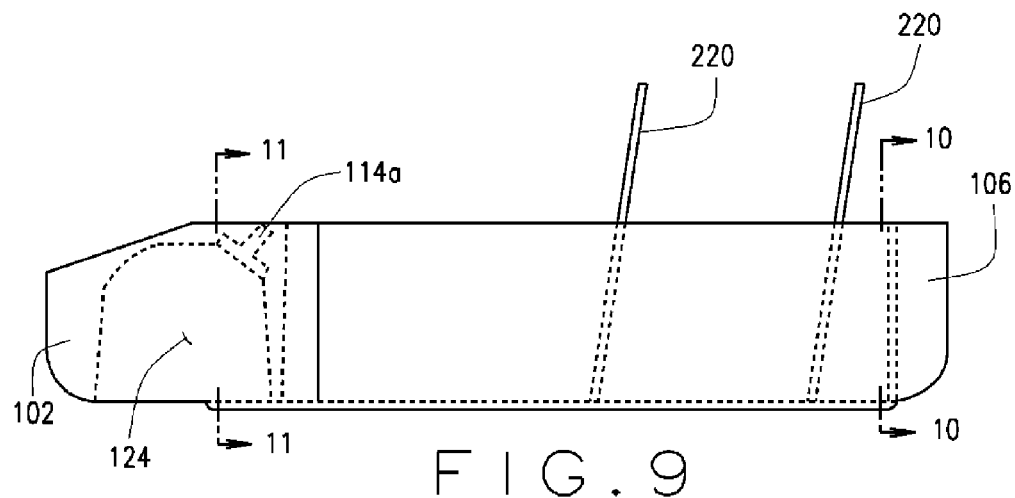
FIG. 9 is a side plan view of an alternate configuration of the reinforced closed-cell foam vehicle chassis.
Figure 10:
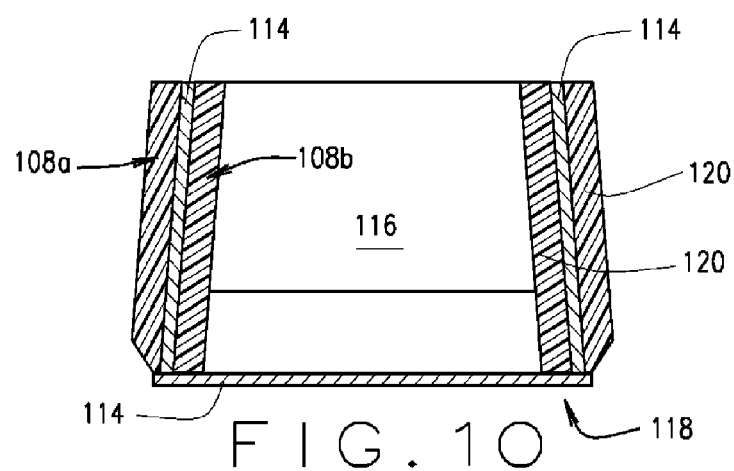
FIG. 10 is a sectional view of the reinforced closed-cell foam vehicle chassis of FIG. 9, taken at line A-A, illustrating placement of a reinforcing layer within the foam chassis structure.
Figure 11:
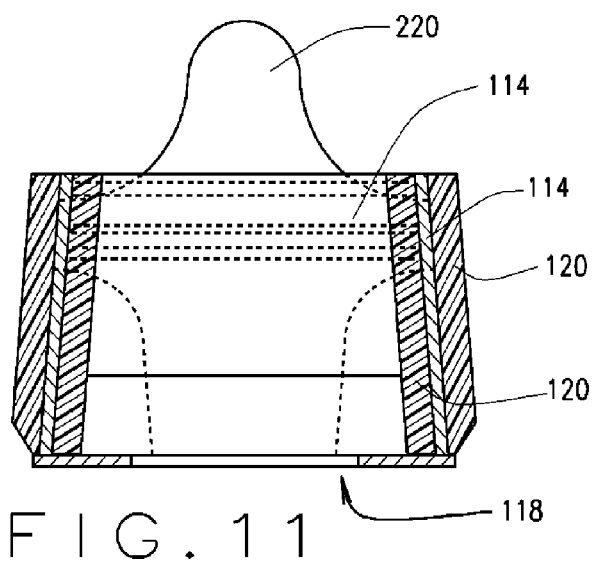
FIG. 11 is a sectional view of the reinforced closed-cell foam vehicle chassis of FIG. 9, taken at line B-B, illustrating placement of a reinforcing layer within the foam chassis structure.
Figure 12:
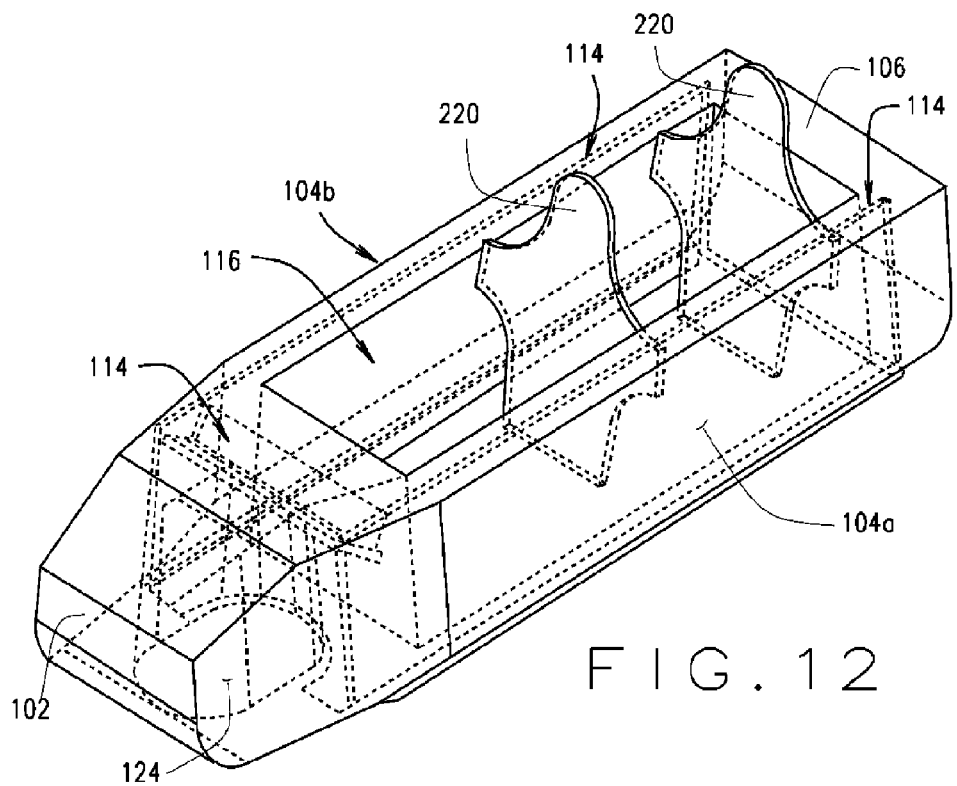
FIG. 12 is a perspective view of the reinforced closed-cell foam vehicle chassis of FIG. 9.
Figure 13:
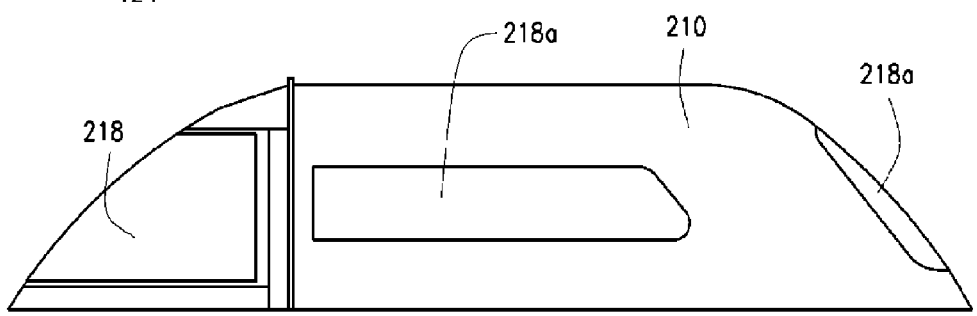
FIG. 13 is a side plan view of a reinforced closed-cell foam door and canopy for use with the reinforced closed-cell foam vehicle chassis of FIG. 9.
Figure 14:
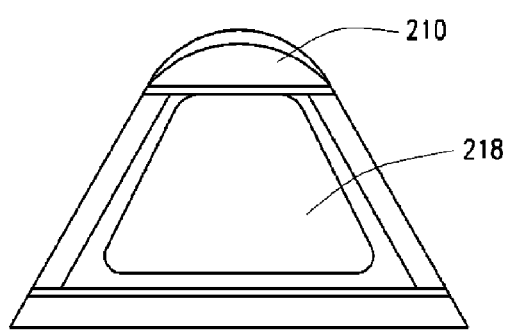
FIG. 14 is a front plan view of the reinforced closed-cell foam door and canopy of FIG. 13.

The front section 102 of the vehicle 200 is formed from a soft foam outer layer 108a, with added strength coming from inside the front wheel compartment where a reinforcing material layer 114 of a fiberglass/epoxy or core board is placed to increase impact strength, as seen in FIG. 3, 9, or 12. The layer of reinforcing material 114 prevents the foam from bending and bursting on impact, while a lining of fiberglass or other material on the exposed surfaces of the central wheel-wheel 124 to protect the foam structure from dirt and rocks thrown into the wheel compartment during travel by a front wheel.

In an alternative process, the reinforced closed-cell foam chassis 100 may be formed by an injection molding technique wherein the closed-cell foam 120 starts as two or more different liquid chemicals. The reinforcing material layers 114 or other rigid structural elements are placed inside a mold before the liquid foam mix is injected together with an epoxy or bonding agent. Optionally, holes may be placed in the reinforcing material layers 114 or other rigid structural elements, at low stress locations, to permit the liquid foam mix to pass through, and bond with, the reinforcing material layers. The holes further permit the liquid foam to flow evenly on both sides of the reinforcing material 114 within the mold, without distortion during expansion. Fiberglass resin may be used instead of an epoxy to save on costs. Alternatively, a layer of fiberglass may be sprayed into place on the finished chassis 100, instead of layering depending, as required to meet various strength, weight, and production costs. Other materials such as core-board, carbon fiber and Kevlar may be used to form the reinforcing layers 114.

By employing layers of a closed-cell foam 120, vehicles 200 constructed with a reinforced closed-cell foam chassis 100 of the present disclosure are buoyant, and may be made amphibious. Optionally, horizontal spokes incorporated into the rims of one or more driving wheels may provide for propulsion in water similar to a paddlewheel boat. These horizontal spoke can be added to the wheels before entering the water or formed as a permanent addition to the wheels. For a tricycle arrangement of wheels, a single front-wheel steering assembly can be made to function as a rudder by fitting a suitable cover to the front wheel. When on land, the over-fitted rudder can be retracted or rotated above the normal operating range of the steering wheel. The combination of permanent horizontal spokes on a driven wheel hub, and a retractable over-fitted rudder will allow the vehicle 200 to be full operated from inside the passenger compartment 116 when transitioning from land to water and water to land. Those of ordinary skill in the art will recognize that alternative propulsion and steering systems may be employed for travel through water by the vehicle 200, such as a propellers or impeller propulsion systems.

As various changes could be made in the above constructions without departing from the scope of the disclosure. For example, those of ordinary skill in the art will recognize that the size, shape, and configuration of the vehicle employing a reinforced closed-cell foam chassis of the present disclosure may be modified from that which is shown and described herein. Furthermore, it will be recognized that the concepts of the present disclosure are not limited to use with complete vehicle chassis, but rather, that the use of the reinforced closed-cell foam may be employed to form any number of different vehicle components, including door panels, trim panels, side panels, etc. and is not limited to use in the construction of a complete vehicle chassis. It is intended that all matter contained in the above description or shown in the accompanying drawings shall be interpreted as illustrative and not in a limiting sense.

The invention claimed is:

1. A structural chassis component for a light-weight motorized vehicle, comprising: a rigid closed-cell foam laminate body having an exterior surface and an interior surface, said closed-cell foam laminate body having at least an outer foam layer defining said exterior surface and an inner foam layer defining said interior surface; at least one rigid reinforcement layer disposed between said outer foam layer and said inner foam layer of said foam laminate body; and one or more rigid structural attachment mountings secured to said foam laminate body.

2. The vehicle component of claim 1 further including a flexible protective layer disposed on at least one of said exterior and interior surfaces of said foam laminate body.

3. The vehicle component of claim 2 wherein said flexible protective layer is UV resistant.

4. The vehicle component of claim 1 wherein said one or more rigid structural attachment mountings are coupled to said at least one rigid reinforcement layer within said closed-cell foam laminate body.

5. The vehicle component of claim 1 wherein said rigid structural attachment mountings include a steering assembly mounting, a plurality of suspension assembly mountings, and a motor mounting.

6. The vehicle component of claim 1 wherein said rigid structural attachment mountings include passenger accommodation mountings and vehicle instrumentation mountings.

7. The vehicle component of claim 1 and wherein said foam laminate body includes a nose segment and a rear segment joined by a pair of side panels and a bottom segment.

8. The improved vehicle chassis of claim 7 wherein said nose segment includes a rigid structural attachment mounting for a steered vehicle wheel assembly; wherein said side panels each include rigid structural attachment mountings for external vehicle wheels; and wherein said bottom panel includes rigid structural attachment mountings on an inner surface within a passenger compartment for passenger accommodations.

9. The improved vehicle chassis of claim 8 wherein at least one of said side panels further includes rigid structural attachment mountings for an external drive motor.

10. The vehicle component of claim 1 wherein said reinforced close-cell foam laminate body is buoyant.

11. The vehicle component of claim 1 wherein said rigid reinforcement layer disposed between said inner and outer foam layers is selected from a set of rigid reinforcement materials including fiberglass, epoxy impregnated fiberglass, aluminum, plastic, honey-comb coreboard, or steel.

12. The vehicle component of claim 1 wherein said foam layers, said rigid reinforcement layer, and said one or more rigid structural attachment mountings are configured to absorb energy during an impact or collision with an external object and to cushion and soften the impact to an external object during an impact or collision.

13. The vehicle component of claim 1 and wherein said inner foam layer is configured to cushion an occupant within a passenger compartment during an impact or collision with an external object.

14. The vehicle component of claim 1 wherein said one or more rigid reinforcement material layers is configured to resist buckling or breaking of said inner and outer foam layers during an impact with an external object.

15. The vehicle component of claim 1 wherein said rigid reinforcement material layer is configured to resist penetration of said reinforced closed-cell foam laminate body during an impact with an external object.

16. A light-weight motorized vehicle, comprising: a laminated foam vehicle chassis having an exterior surface defined by at least an outer layer of closed-cell foam, an interior surface defined by an inner layer, and at least one rigid structural reinforcement material layer disposed between portions of said outer foam layer and said inner foam layer; at least one steerable wheel coupled to a steering assembly mounted to a structural attachment mounting disposed within said laminated foam vehicle chassis; a drive motor externally secured to a second structural attachment mounting in said laminated foam vehicle chassis; at least one driven wheel mounted to a third structural attachment mounting on said laminated foam vehicle chassis and operatively coupled to a drive system driven by said drive motor; and internal accommodations within a passenger compartment for at least one operator disposed within an interior volume of said laminated foam vehicle chassis.

17. The light-weight motorized vehicle of claim 16 wherein said at least one steerable wheel defines a single front wheel, and wherein said at least one driven wheel, together with at least one additional wheel transversely displaced there from about a common axis of rotation, define a pair of rear wheels.

18. The light-weight motorized vehicle of claim 16 wherein said laminated foam vehicle chassis is buoyant, and wherein said vehicle is amphibious.

19. The light-weight motorized vehicle of claim 16 wherein said laminated foam chassis is configured to absorb impact energy during a collision by deformation of said inner and outer layers of foam.

20. The light-weight motorized vehicle of claim 16 wherein said laminated foam chassis is configured to resist pass-through penetration of objects into a contained passenger compartment during a collision.

\* \* \* \* \*